Sept. 27, 1966     R. C. SHORE     3,275,171
VEHICLE WITH SWINGABLE LOAD-SUPPORTING STRUCTURE
Filed May 19, 1964     2 Sheets-Sheet 1
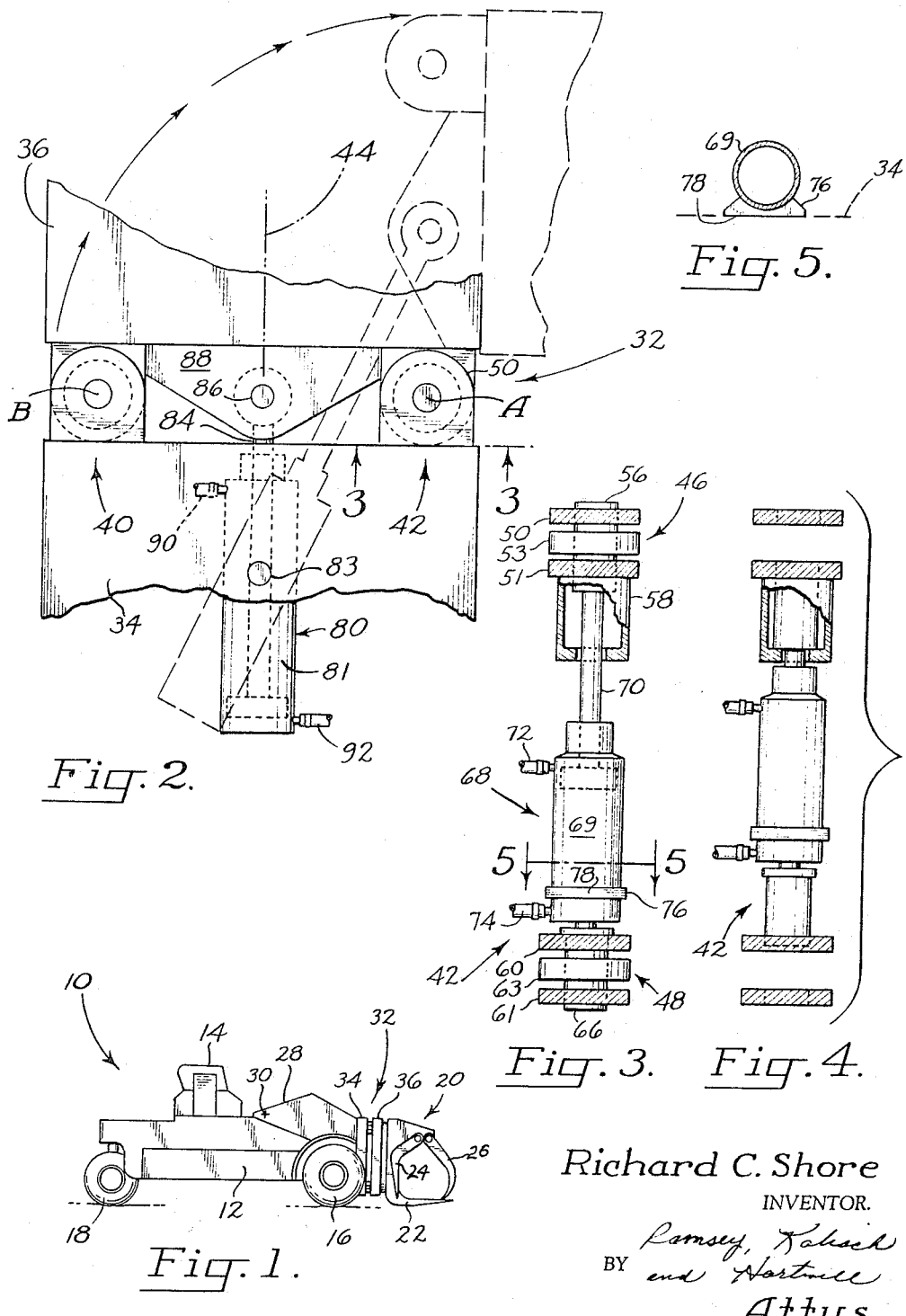
Richard C. Shore
INVENTOR.
BY Ramsey, Kalish
and Hartwell
Attys.

Richard C. Shore
INVENTOR.

United States Patent Office 3,275,171
Patented Sept. 27, 1966

3,275,171
VEHICLE WITH SWINGABLE LOAD-SUPPORTING
STRUCTURE
Richard C. Shore, Portland, Oreg., assignor of fifty percent
to Scott S. Corbett, Jr., Portland, Oreg.
Filed May 19, 1964, Ser. No. 368,675
1 Claim. (Cl. 214—131)

This invention relates to a vehicle, and more particularly to a vehicle with means for supporting a load which may be swung from side to side relative to the vehicle's longitudinal axis. Certain industrial vehicles, for instance, may have mounted thereon various forms of load-attaching or supporting means, such as forks, grapples, buckets, etc. and for maximum versatility it is important that these be swingable from a position projecting toward one to a position projecting toward the other side of the vehicle.

Various mechanisms have been proposed for mounting load-supporting structures or attachments on a vehicle, with such supporting structures being swingable laterally. A disadvantage common to many is that some central pivot axis is provided for the load-supporting structure, which is located well forwardly on the vehicle so as to accommodate full lateral swinging, and because of this forwardly disposed location of the pivot axis undesirable overhang tends to result. This is detrimental to the balancing of the vehicle, and limits the size of the load it may handle. Further, with such a construction, the attachment itself must be located well forwardly of the pivot axis, if the attachment upon side swinging ultimately is to be properly positioned at the side of the vehicle. In other types of devices, swinging of the attachment from one side to the other about 180° may only be accomplished after a cerain number of adjustments and settings are made which, of course, is time consuming and troublesome. In still other constructions, full side to side positioning is only accomplished with some sacrifice in the strength of the connection between the vehicle and the attachment.

Generally, an object of this invention is to provide for a vehicle novel mechanism for attaching a load-supporting means thereon, which accommodates side swinging of the load-supporting means from one side to the other of the vehicle, with such produceable in a region located closely adjacent the vehicle, whereby objectionable overhang and imbalance are eliminated.

More specifically, an object of the invention is to provide means for mounting a load-supporting structure, such as a grapple or other device, on a vehicle, where swinging takes place about multiple axes upon shifting of the attachment a full 180°, with such axes disposed close to the vehicle. With lateral swinging of the load-supporting structure to the right, the pivot axis about which swinging occurs is one which is adjacent the right of the vehicle, and with swinging to the left, the pivot axis is adjacent the left.

Yet another object is to provide mounting mechanism for a load-supporting means, where swinging is about multiple laterally spaced axes as described, and such swinging is accommodated by making and breaking, in proper sequence, different hinge mechanisms interposed between the load-supporting means and the vehicle.

Yet a further object is to provide structure as contemplated above, which enables a load-supporting means to be mounted on a vehicle through a pair of laterally spaced connections when the load-supporting means is projecting straight forward. Prior to swinging the load-supporting means laterally, in either of opposite directions, one of these laterally spaced connections is broken down, and pivotal movement then occurs about the connection which still remains.

Yet another object is to provide a vehicle where side angling of a load-supporting means is accomplished by means of a power-operated, extensible device which, with the load-supporting means projecting straight ahead from the vehicle, occupies a position extending along the longitudinal axis of the vehicle, and which, when extended, produces lateral swinging in either of opposite directions.

Another object is to provide novel control means for making and breaking hinge connections interposed between a vehicle and load-supporting means. It is contemplated that an operator may produce proper angling of the load-supporting means with a minimum amount of experience. The control means or system selected is one that insures a hinge connection between the vehicle and load-supporting means is not broken down unless another hinge connection is first established. The control system contemplated also features means whereby an attachment or load-supporting means will automatically come to a stop in straight ahead position, on being swung from one side toward the other.

A still further object is to provide a novel type of hinge mechanism for mounting an attachment on a vehicle, which is easily broken down to enable separation of parts therein; and which produces a rugged swivel or pivot connection capable of carrying heavy loads when a pivot connection between the vehicle and attachment is established through the hinge mechanism.

These and other objects and advantages are attained by the invention, and the same is described hereinbelow in conjunction with the accompanying drawings, wherein:

FIGURE 1 illustrates a vehicle according to this invention, provided at the forward end thereof with a forked grappling attachment, the latter being illustrative of a load-supporting means which, for optimum utility, should be swingable a full 90° to right or left of the vehicle;

FIGURE 2 is a top plan view, on a somewhat enlarged scale, illustrating mechanism contemplated for mounting the attachment on the forward end of the vehicle;

FIGURE 3 is a cross sectional view, taken along the line 3—3 in FIGURE 2, illustrating in detail a hinge mechanism which is part of the mechanism connecting the attachment on the vehicle;

FIGURE 4 illustrates the hinge mechanism of FIGURE 3, with the parts in a different position;

FIGURE 5 is a cross sectional view, taken along the line 5—5 in FIGURE 3, and

Figure 6:
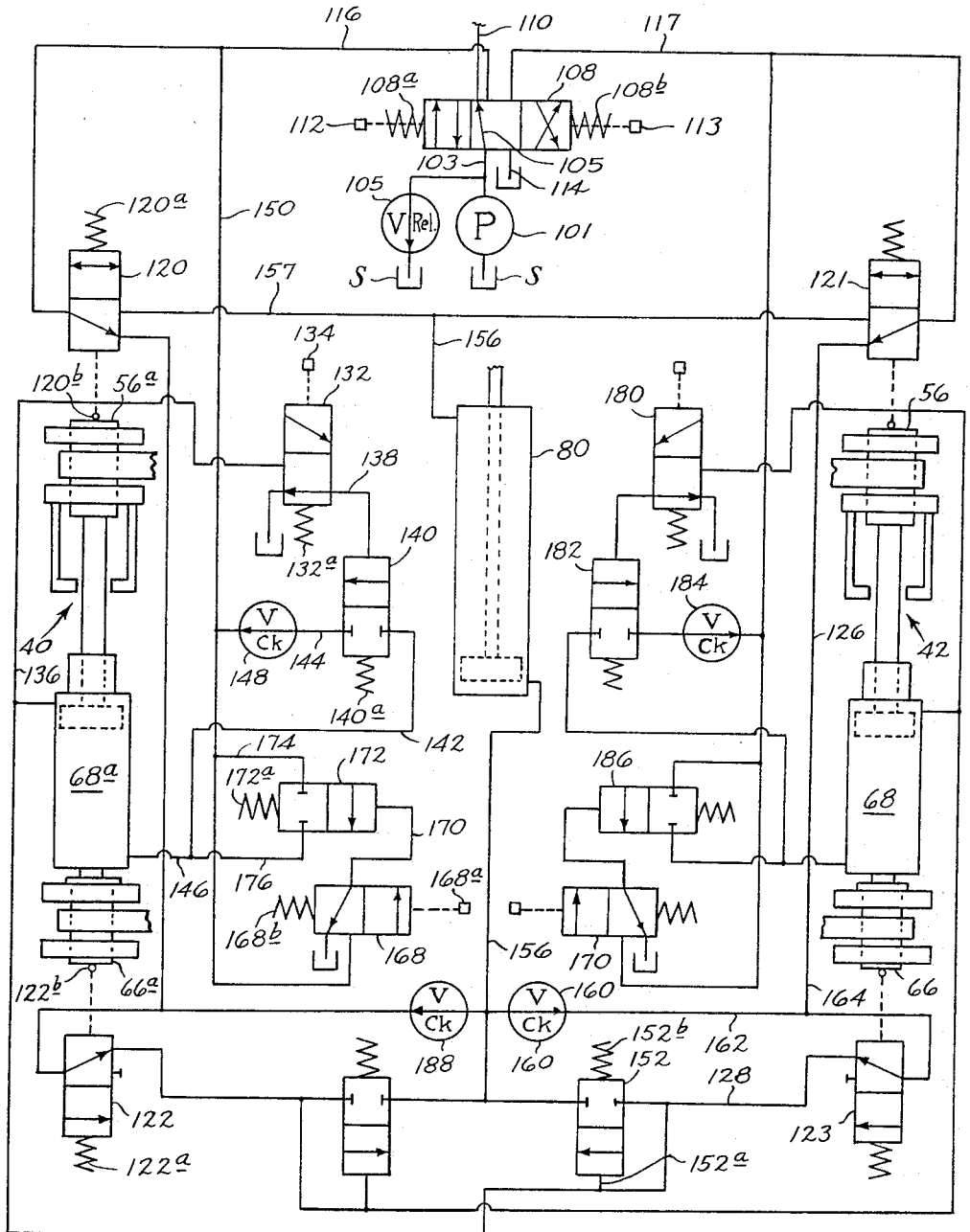
FIGURE 6 illustrates, schematically, an hydraulic control system utilized to produce actuation of extensible means effecting the breaking down or putting together of hinge mechanisms in the construction.

Referring now to the drawings, and first of all to FIG. 1, a vehicle is shown at 10 including a frame 12, a cab 14, and supporting the vehicle above the ground for movement thereover, a pair of opposed lateral support wheels 16 at the forward end thereof (one of which is obscured in FIG. 1), and a rear wheel 18. Wheel 18 is a dirigible wheel, and is turned by the operator for steering purposes. A vehicle of the type illustrated is commonly used in heavy duty, load-handling operations.

Mounted on the forward end of the vehicle is a forked grappling attachment, or load-supporting means, 20. Such attachment may include a pair of laterally spaced forks 22, only one of which is shown, which projects from the base of the attachment. Cooperating with these forks to hold onto a load, and provided on each side of the attachment, is a set of pivoted arms, such as the set shown which includes arms 24 and 26. Suitable means (not illustrated) may be provided for actuating these arms, to bring them together or to swing them apart. The attachment illustrated is used in handling long poles, by holding onto the poles between their ends.

Vehicle 10 has a short boom 28 connected to frame 12 and projecting forwardly from the cab. Boom 28 may be swung up and down about an axis indicated at 30, for the purpose of raising and lowering a load. Attachment 20 is attached to boom 28 through a double hinge mechanism which accommodates lateral swinging of the attachment a full 90° to the right or to the left, such double hinge mechanism being indicated generally at 32.

Referring now to FIGS. 2, 3, 4, and 5, and considering more specifically the structure of mechanism 32, at 34 is indicated a box-like frame which is mounted on the forward end of boom 28, and which thus can be considered as mounted on the vehicle. In front of this box-like frame, and part of the attachment, is another box-like frame 36. With the attachment positioned so that it extends straight forward from the vehicle, the attachment, through its box-like frame 36, is connected to the vehicle (box-like frame 34) by a pair of hinge mechanisms, indicated at 40 and 42, positioned laterally on either side of the longitudinal axis of the vehicle, the latter being indicated generally at 44.

Each hinge mechanism may be of the type illustrated in FIGS. 3 and 4 where hinge mechanism 42 is shown in elevation. Thus, and referring to these figures, each may comprise a pair of pivot assemblies indicated at 46, 48 which are vertically aligned with each other, and are positioned adjacent the top and adjacent the bottom of the hinge mechanism, respectively.

Pivot assembly 46 comprises lugs or hinge parts 50, 51, which are joined to box-like structure 34 and between these a lug or hinge part 53, which is joined to box-like structure 36. Establishing a pivot connection between lugs 50, 51 and lug 53 is a pivot pin 56 extending through accommodating bores provided in the various lugs. A bushing portion 58 is joined to lug 51 which slidably receives a lower portion of pin 56.

Pivot assembly 48 comprises lug or hinge parts 60, 61, which are also part of box-like structure 34, and between these lugs a hinge part 63 which is joined to box-like structure 36. Establishing a pivot connection between these lugs is a pivot pin 66 extending through accommodating bores provided in the lugs.

Between the upper and lower pivot assemblies is an extensible means, more specifically, a fluid-operated, extensible motor or jack 68. Jack 68 includes a cylinder 69 and a piston rod 70. Rod 70, which projects from the top of the jack or ram, is connected to pin 56, and the cylinder of the jack is connected to pin 66. Fluid enters and leaves opposite ends of the cylinder through conduits 72, 74. A shoe 76 joined to the cylinder has a flat face 78 which is slidably supported on the front of box-like structure 34.

The extensible means, i.e., the jack or ram of each hinge mechanism, may be actuated in such a way as either to establish a pivot connection between the attachment and vehicle through the hinge mechanism, as shown in FIG. 3, or to break down the hinge mechanism, whereby the attachment and vehicle are separable from each other at the hinge mechanism. The latter condition is illustrated in FIG. 4.

If pressure fluid is admitted to the top of cylinder 69 the ram contracts, whereby pin 56 is drawn downwardly into bushing portion 58, with the base thereof then striking the base of the bushing portion. The cylinder shifts upwardly on contraction of the ram to shift bottom pin 66 to the position illustrated in FIG. 4, where its bottom end is located in hinge part 60. This leaves hinge parts 53, 63 free to move out of the hinge parts that cooperate therewith in completing the hinge mechanism. With extension of the ram, the pins are extended to establish a pivot connection through the hinge mechanism as shown in FIG. 3.

Since it is shifting of the pins that breaks down a hinge mechanism, the pins are referred to herein as break-down means.

Referring to FIG. 2, mounted on box-like portion 34 is an extensible means or ram 80. With the attachment extending straight ahead from the vehicle, and pivot connections established through both of hinge mechanisms 40, 42, ram 80 is substantially aligned with the longitudinal axis of the vehicle. Cylinder 81 of the ram is pivotally connected to portion 34 at 83, and rod 84 in the ram is pivotally connected at 86 to a bracket 88 which forms part of the attachment.

Pressure fluid is admitted to opposite ends of ram 80 through conduits 90, 92. As best shown by comparing the full and dashed outline of the attachment in FIG. 2, if hinge mechanism 40 at the left in the figure is broken down to produce separation between the attachment and vehicle on the left, on extension of the ram, the attachment will be caused to swing to the right about a pivot axis indicated at A, provided by hinge mechanism 42. With hinge mechanism 42 broken down, and a pivot connection established through hinge mechanism 40, on extension of the ram, the attachment will be caused to swing to the left, about a pivot axis indicated at B.

Thus it will be noted that a single extensible means, i.e., ram 80, may be provided to produce either left or right hand swinging of the attachment. This swinging is about pivot axes located close to the vehicle and on laterally opposite sides of the vehicle, i.e., axes A and B. With the attachment positioned straight ahead, as would normally be the case when the heaviest loads were handled, the attachment and vehicle may be connected through both hinge mechanisms, and this results in maximum strength in the mounting for the attachment.

In FIG. 6 an hydraulic control circuit is illustrated such as may be used to produce angling or swinging of the attachment as described. A circuit is selected which insures that before swinging of the attachment to either side of the vehicle is possible, the hinge mechanism which is to define the pivot axis must be connected and not in a broken down state.

Referring to FIG. 6 at 101 there is shown a pump which supplies fluid under pressure. In the drawing, U-shaped symbols S indicate a common sump. Pump 101 draws hydraulic fluid from the sump, and discharges the same under pressure into conduit 103. At 105 there is indicated a relief valve through which fluid may return to the sump.

A main control valve is schematically illustrated by a rectangular outline 108. Zig zag lines 108a, 108b at the ends of outline 108 represent springs biasing the valve. In understanding the operation of the valve, the rectangular outline may be thought of as representing the valve spool, and different boxes or squares within the valve illustrate flow through the valve with the valve spool in different adjusted positions. As illustrated, springs 108a, 108b exert an equal and opposite bias on the spool of the valve, and flow through the valve is as indicated by arrow 105 in the central box, which is from conduit 103 to a conduit 110. With such a flow, the fluid may be utilized to perform various functions in the vehicle which are not described herein, as they are not part of the invention.

Considering again valve 108, 112 and 113 indicate manually actuated means or buttons which may be actuated to shift the valve spool to various adjusted positions. By depressing button 113, spring 108b is compressed, and flow through the value is as indicated by the arrows in the right hand box within the rectangular valve outline, or along crossed paths. Thus the rectangular outline for the valve may be thought of as shifted to the left, to place the arrows within the right hand box in registry with conduit 103, a sump conduit 114, and a pair of conduits 116, 117 indicated above the valve. With button 112 depressed, the valve outline may be thought of as shifted to the right, so that flow through the valve is as indicated by the arrows in the left hand box within the outline, or along parallel paths.

In FIG. 6, the various parts are illustrated as they would be positioned with the attachment extending straight forwardly from the vehicle and with both hinge mechanism interconnecting the attachment and vehicle. Thus it will be seen that the jacks 68, 68a of both hinge mechanisms are extended, and that the pins at the ends of these jacks interconnect hinge parts in the various pivot assemblies.

Indicated at 120 and 122 are a pair of valves which are controlled by pins 56a, 66a of hinge mechanism 40. With jack 68a of the hinge mechanism extended, pins 56a, 66a through responsive devices 120b, 122b may be thought of as shifting the spools of the valves, as represented by the rectangular outline shown for the valves, upwardly and downwardly, respectively, so that flow takes through the valves as indicated by the bottom box in the rectangular valve outline in the case of valve 120, and the top box in the rectangular valve outline in the case of valve 122. With jack 68a contracted, spring 120a for valve 120 biases its valve spool downwardly so that flow is as indicated by the arrow in the top box in the rectangular outline for the valve, and spring 122a of the valve 122 biases its valve spool upwardly so that flow through the valve is as indicated by the bottom box in the rectangular outline for the valve. Valves 121 and 123 are similar, and are similarly associated with jacks 68 of hinge mechanism 42.

With a pivot connection established through both of the hinge mechanisms between the vehicle and attachment as illustrated in FIG. 6, and assuming that it is desired to break down hinge mechanism 40 whereby the vehicle and attachment on this side of the vehicle become separated from each other, an operator depresses button 113 to adjust valve 108 so that a crossed flow pattern takes place through the valve. When this occurs, conduit 117 contains fluid under pressure, and conduit 116 is connected to the sump. This produces flow through conduit 117, valve 121 (as indicated by the arrow in the bottom box of the valve outline), conduit 126, valve 123 (as indicated by the arrow in the top box of the valve outline), conduit 128, and conduit 130, to the top of the cylinder for jack 68a. At the same time that the operator actuates valve 108, he actuates a valve 132, by a control button or means 134, whereby its valve spool is shifted against the bias of spring 132a so that flow takes place through the valve as indicated by the top box in the rectangular outline for the valve. With the valve so actuated, fluid under pressure may flow from conduit 130, through conduit 136, and valve 132, to pilot line 138 which is connected to the pilot side of a pilot-operated valve 140.

In the case of this and other pilot-operated valves, the rectangular outline representing the valve may again be thought of as the valve spool, and the zig zag line or spring (spring 140a) joined to one end of the rectangular outline for the valve may be considered as biasing the spool so that flow takes place through the valve as indicated by the symbol or symbols within the box in the valve outline to which the spring attaches. In this case a discontinuous line extends through the bottom box in the outline for valve 140, and with spring 140a controlling, no flow occurs through the valve. The pilot line connected to the opposite end of the rectangular outline for the valve, when fluid under pressure is contained therein, operates to actuate the valve whereby the spool of the valve may be thought of as urged against the biasing of spring 140a so that valve flow takes place as indicated by the symbol or symbols in the top box in the valve outline. Thus, with fluid under pressure in pilot line 138, pilot-operated valve 140 is actuated so as to connect conduits 142 and 144 through the valve. Conduit 142 is connected to conduit 146 joining with the base of the cylinder for ram 68a. As a consequence, fluid may be exhausted from the bottom end of the cylinder, through conduit 146, conduit 142, valve 140, conduit 144, a check valve 148, and a conduit 150, to conduit 116, and the sump.

It will be seen from this much of the description that contraction of jack 68a is not possible unless valves 121, 123 are in the position shown, i.e., unless jack 68 is fully extended. This is a safety feature, in that it insures that hinge mechanism 40 may not be broken without hinge mechanism 42 establishing a pivot connection between the attachment and vehicle.

In FIG. 6 there will be noted, adjacent where conduits 130 and 128 connect, a pressure responsive valve 152. This valve is also pilot operated, and in the absence of any pressure in its pilot line 152a no flow takes place therethrough. With a sufficient pressure established in conduit 128 and pilot line 152a, and with hinge mechanism 40 broken down, the spool of the valve is shifted against the biasing of spring 152b, whereby the flow is as indicated by the bottom box in the rectangular outline representing the valve. This admits fluid under pressure to conduit 156 and one end of ram 80 which, as already indicated, is utilized to swing the attachment once one side thereof has been loosened. Exhaust from the opposite end of the ram takes place through conduit 156, conduit 157, valve 120 (this valve because of the retraction of the pins of hinge mechanism 40 being biased so that the box in the top of the rectangular outline for the valve indicates fluid flow), conduit 116, to the sump.

In this way, the attachment may be swung a full 90°, with pivoting occurring through the pivot connection established by hinge mechanism 42 and pins 56, 66.

To center the front end attachment after such has been swung to one side as described, an operator depresses button 112 to shift the spool of valve 108 so that flow is as indicated by the box in the left hand part of the rectangle for the valve, i.e., along parallel paths. This introduces fluid under pressure through conduit 116 and conduits 157 and 156 to the top of the cylinder of ram 80. Fluid is exhausted from the base of the ram through conduit 156, a check valve 160, conduit 162, conduit 164, valve 121, and conduit 117, to the sump.

An important feature of this invention is that when the attachment is returned to a straight ahead position, the jacks for the two hinge mechanisms automatically are operated to establish a pivot connection between the vehicle and attachment at each of the hinge mechanisms. This is the result of actuation of one or the other of mechanically operated valves 168, 170 shown in FIG. 6. Each of these includes a device such as the button shown at 168a for valve 168, which is actuated upon the attachment reaching a straight ahead position, to produce extension of the jack controlling the pins in that hinge mechanism which up to this time is not producing a pivot connection between the vehicle and attachment.

With reference to hinge mechanism 40, in FIG. 6 it will be seen that valve 168, when actuated by button 168a, has its spool shifted against the bias of spring 168b, to a position accommodating the flow of fluid through the valve, from conduit 150 to pilot line 170. The latter is connected to the pilot side of a pilot-operated valve 172. The spool of valve 172, which without pressure fluid in the pilot line is actuated by spring 172a so as to prevent flow through the valve, is shifted with pressure fluid in line 170 against the bias of the spring to enable flow as indicated by the right hand box for the rectangular outline representing the valve, whereby flow may take place from conduit 150, through conduit 174, valve 172, conduit 176, conduit 146, to the base of the cylinder from ram 68a. Exhaust from the opposite end of the ram may then take place through conduit 130, conduit 128, valves 123, 121, and conduit 117 to the sump. In this manner, extension of pins 56a, 66a, and the establishment of a pivot connection through hinge mechanism 40, takes place.

In FIG. 6 a circuit similar to the one just described is provided for actuating ram 68 at the right of the figure, whereby it contracts to remove pins 56 and 66 from the hinge parts that they interconnect, whereby hinge mechanism 42 is broken down. Thus, and describing this circuit only briefly (because its operation is similar to the operation of the circuit just described), valve 180 corresponds to valve 132, valve 182 corresponds to valve 140, valve 184 corresponds to valve 148, valve 186 corresponds to pilot-operated valve 172, and check valve 188 corresponds to check valve 160.

It should be obvious from the above that the vehicle with front end attachment, as contemplated by the invention, possesses a number of unique features which distinguish it from prior known types of vehicle. Side swinging of the attachment is performed in a region close to the vehicle, and excessive overhang is eliminated. In effect, the pivot axis for the attachment is shifted between two laterally spaced points, depending upon to which side of the vehicle the attachment is swung. With the attachment either to the left or right of the vehicle, it is firmly supported by one of the hinge mechanisms disclosed, each of which comprises upper and lower pivot assemblies producing necessary stability. Each hinge mechanism is acted upon by one extensible ram, which performs the function of releasing and interconnecting the two pivot assemblies therein.

With the attachment in a straight ahead position, the attachment is held securely, adjacent opposite sides of the vehicle by both of the hinge mechanisms. Upon swinging of the attachment from a side position to a straight ahead position, the attachment automatically centers itself and automatically both hinge mechanisms are placed in a condition interconnecting the vehicle and the attachment. In this condition the apparatus, of course, can handle the heaviest of loads.

While there has been described an embodiment of the invention, variations and modifications are possible without departing therefrom. It is desired to cover all such variations and modifications as would be apparent to one skilled in the art, and that come within the scope of the appended claim.

It is claimed and desired to secure by Letters Patent:
In a vehicle,
 a vehicle frame and a boom pivoted at one end on said frame, load-supporting means disposed at the end of said boom opposite its said one end,
 a pair of hinge mechanisms adjacent opposite sides of the boom connecting the boom and load-supporting means and permitting the load-supporting means to be pivoted selectively about transversely spaced vertical axes,
 each of said hinge mechanisms including pin means that may be shifted so as to break down the hinge mechanism thus to disconnect the load-supporting means from the boom at the hinge mechanism,
 power-operated means for each pin means mounted on the boom for so shifting the pin means,
 motor means connected to a central portion of the load-supporting means and said boom, operable on actuation to thrust said central portion away from the boom, and
 control means for the power-operated means for the pins of the pair of hinge mechanisms, whereby each may be actuated, selectively,
 said control means including a device actuated by one of the hinge mechanisms, when the same completes a connection between the boom and load-supporting means, freeing for actuation the power-operated means for the other hinge mechanism, and a device actuated by said other hinge mechanism, when the same completes a connection between the boom and load-supporting means, freeing for actuation the power-operated means for said one hinge mechanism.

References Cited by the Examiner

UNITED STATES PATENTS

| 2,072,998 | 3/1937 | Allin | 298—17.6 |
| 2,646,182 | 7/1953 | Maas | 214—672 |
| 2,950,831 | 8/1960 | Anzons | 214—731 |
| 2,958,434 | 11/1960 | Wagner | 214—147 X |
| 3,198,358 | 8/1965 | Gardner | 214—140 |

FOREIGN PATENTS

| 939,756 | 4/1948 | France. |
| 1,038,163 | 9/1953 | France. |
| 912,302 | 5/1954 | Germany. |

MARVIN A. CHAMPION, *Primary Examiner.*

GERALD M. FORLENZA, *Examiner.*

R. B. JOHNSON, *Assistant Examiner.*